US012654948B2

(12) United States Patent
Adamík et al.

(10) Patent No.: US 12,654,948 B2
(45) Date of Patent: Jun. 16, 2026

(54) SELF-GUIDING LEAD-IN SLIDER PAN

(71) Applicant: Intelligrated Headquarters, LLC, Mason, OH (US)

(72) Inventors: Petr Adamík, Jihlava (CZ); Jakub Barcuch, Valasske Klobouky (CZ); Jan Kazda, Brno (CZ); Martin Menoušek, Černá Hora (CZ); Zdenek Jasa, Velka Bites (CZ)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 121 days.

(21) Appl. No.: 18/806,481

(22) Filed: Aug. 15, 2024

(65) Prior Publication Data

US 2026/0048944 A1     Feb. 19, 2026

(51) Int. Cl.
B65G 15/62          (2006.01)
B65G 21/22          (2006.01)

(52) U.S. Cl.
CPC .............. B65G 15/62 (2013.01); B65G 21/22 (2013.01)

(58) Field of Classification Search
CPC ................................. B65G 15/62; B65G 21/22
See application file for complete search history.

(56) References Cited

U.S. PATENT DOCUMENTS

| | | | | | |
|---|---|---|---|---|---|
| 2,095,494 | A | * | 10/1937 | Dobbs | B65G 11/146 193/6 |
| 5,165,258 | A | * | 11/1992 | Kogen | A44C 7/00 63/12 |
| 5,224,582 | A | * | 7/1993 | Hahn | B65G 19/287 198/861.2 |
| 5,310,047 | A | * | 5/1994 | Ledingham | B65G 15/62 198/841 |
| 5,762,178 | A | * | 6/1998 | Tarlton | B65G 21/06 198/860.2 |
| 6,796,418 | B1 | * | 9/2004 | Harrison | B65G 21/06 198/861.1 |
| 7,207,431 | B1 | | 4/2007 | Singleton | |
| 7,246,697 | B2 | * | 7/2007 | Hosch | B65G 21/16 198/841 |
| 7,562,764 | B2 | * | 7/2009 | Schmidt | E21F 13/06 198/861.2 |

(Continued)

OTHER PUBLICATIONS

Conveyer & CAster, "SB Slider Bed Horizontal Belt Conveyer: Conveyer & Caster", retrieved from the Internet at https://www.cc-efi.com/products/conveyor-systems/sb-slider-bed-horizontal-belt-conveyor/ on Jul. 8, 2025, 6 pages.

(Continued)

*Primary Examiner* — Mark A Deuble
(74) *Attorney, Agent, or Firm* — Alston & Bird LLP

(57) ABSTRACT

A slider pan and a method is disclosed. The slider pan comprises a plate having an edge and a side panel that is monolithic with or detachably coupled to the edges of the plate. The side panel extends from the plate at a predefined angle. The side panel is configured to have a pair of lead-in features and a square notch positioned between the pair of lead-in features. The pair of lead-in features comprises a first slanted edge and a second slanted edge. Further, the pair of lead-in features are configured to facilitate positioning a bolt having a square neck within the square notch.

20 Claims, 7 Drawing Sheets

(56) References Cited

U.S. PATENT DOCUMENTS

| | | | |
|---|---|---|---|
| 8,069,977 B2 | 12/2011 | Avery | |
| 8,770,393 B1 * | 7/2014 | DeGennaro, Jr. ...... | B65G 21/22 |
| | | | 198/860.1 |
| 10,435,426 B2 * | 10/2019 | Um ......................... | C07H 1/06 |
| 2010/0213037 A1 | 8/2010 | Avery | |

OTHER PUBLICATIONS

Honeywell, "M-Series Case, Tote and Polybag Conveyor System", Brochure, dated Feb. 2021, retrieved from the Internet at https://info.intelligrated.com/rs/669-GGZ-114/images/%28CTPBR%28ENEU%29-Case_Tote_Poly_LR. pdf on Jul. 8, 2025, 8 pages.
Jorgensen, "Conveyor and Filtration Solutions: Slider Bed Belt Conveyor", retrieved from the Internet at https://www.jorgensenconveyors.com/product/slider-bed-belt-conveyors/ on Jul. 8, 2025, 1 page.
SJF, "Slider Bed Belt Conveyors (New & Used): Slider Bed Conveyor—Used", retrieved from the Internet at https://www.sjf.com/slider-bed-conveyor.html# on Jul. 8, 2025, 6 pages.

* cited by examiner

SELF-GUIDING LEAD-IN SLIDER PAN

TECHNOLOGICAL FIELD

Example embodiments of the present disclosure generally relates to a conveyor system, and more particularly relates to a slider pan for a conveyor system.

BACKGROUND

Conveyor systems are integral to industries, providing efficient transport of materials and products through various stages of production, packaging, and distribution. One critical component of the conveyor systems is the conveyor slider pan, typically made from sheet metal, which supports the belt and ensures smooth movement of goods. The conveyor slider pan is attached to the top of the side rails using carriage bolts and the carriage bolts must be aligned with corresponding slots in the sheet metal of the slider pan. During installation, workers must align the slots in the conveyor slider pans with the pre-positioned carriage bolts in the conveyor frame. The process demands a high degree of precision; even slight misalignments can prevent proper attachment. Regular maintenance of the conveyor systems often necessitates the removal of the conveyor slider pan to access the inner components of the conveyor systems. Regular maintenance involves loosening the carriage bolts, detaching the conveyor slider pans, performing the necessary maintenance, and then reattaching the conveyor slider pans. The process of regular maintenance is labor-intensive and time-consuming due to the difficulty in realigning the slots and bolts accurately each time.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a slider pan is disclosed. The slider pan comprises a plate having an edge and a side panel that is monolithic with or detachably coupled to the edge of the plate. The side panel extends from the plate at a predefined angle. The side panel comprises a pair of lead-in features that each comprise a first slanted edge and a square notch positioned between the pair of lead-in features. Further, the pair of lead-in features are configured to facilitate positioning a bolt having a square neck within the square notch.

In some embodiments, the plate is planar, and the predefined angle is a right angle.

In some embodiments, the slider pan comprises two side panels and a transverse panel that extends between the two side panels. The two side panels are parallel to each other.

In some embodiments, the side panel has a flat edge portion. One of the pair of lead-in features extends from the flat edge portion.

In some embodiments, a first pitch angle is defined between the flat edge portion and the first slanted edge of the lead-in feature that extends from the flat edge portion. The first pitch angle is in between 10-20 degrees.

In some embodiments, each lead-in feature comprises a second slanted edge that extends from the square notch. A second pitch angle is defined between a line that extends parallel to the flat edge portion and the second slanted edge.

In some embodiments, the side panel comprises two pairs of lead-in features. The flat edge portion is positioned between the two pairs of lead-in features. The flat edge portion is configured to allow a user to slide the plate in a horizontal direction over the square neck of the bolt.

In some embodiments, each lead-in feature comprises a second slanted edge. The first slanted edge gets farther from the plate as it gets closer to the square notch. The second slanted edge gets closer to the plate as it gets farther from the square notch.

In some embodiments, the first slanted edge of each of the lead-in features is configured to lift the slider pan while the slider pan slides on the square neck of the bolt to provide an indication of a proximity of the bolt to the square notch.

In some embodiments, the square neck of the bolt has a diagonal that is larger than a width of the square notch to prevent a rotation of the bolt when the square neck of the bolt is within the square notch.

In another example embodiment, a method is disclosed. The method comprising steps of coupling, monolithically or detachably, a side panel to an edge of a plate. The side panel is extending from the plate at a predefined angle. The side panel comprising a pair of lead-in features that each comprise a first slanted edge and a square notch positioned between the pair of lead-in features. Further, the method comprising facilitating, via the pair of lead-in features, positioning a bolt having a square neck within the square notch.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
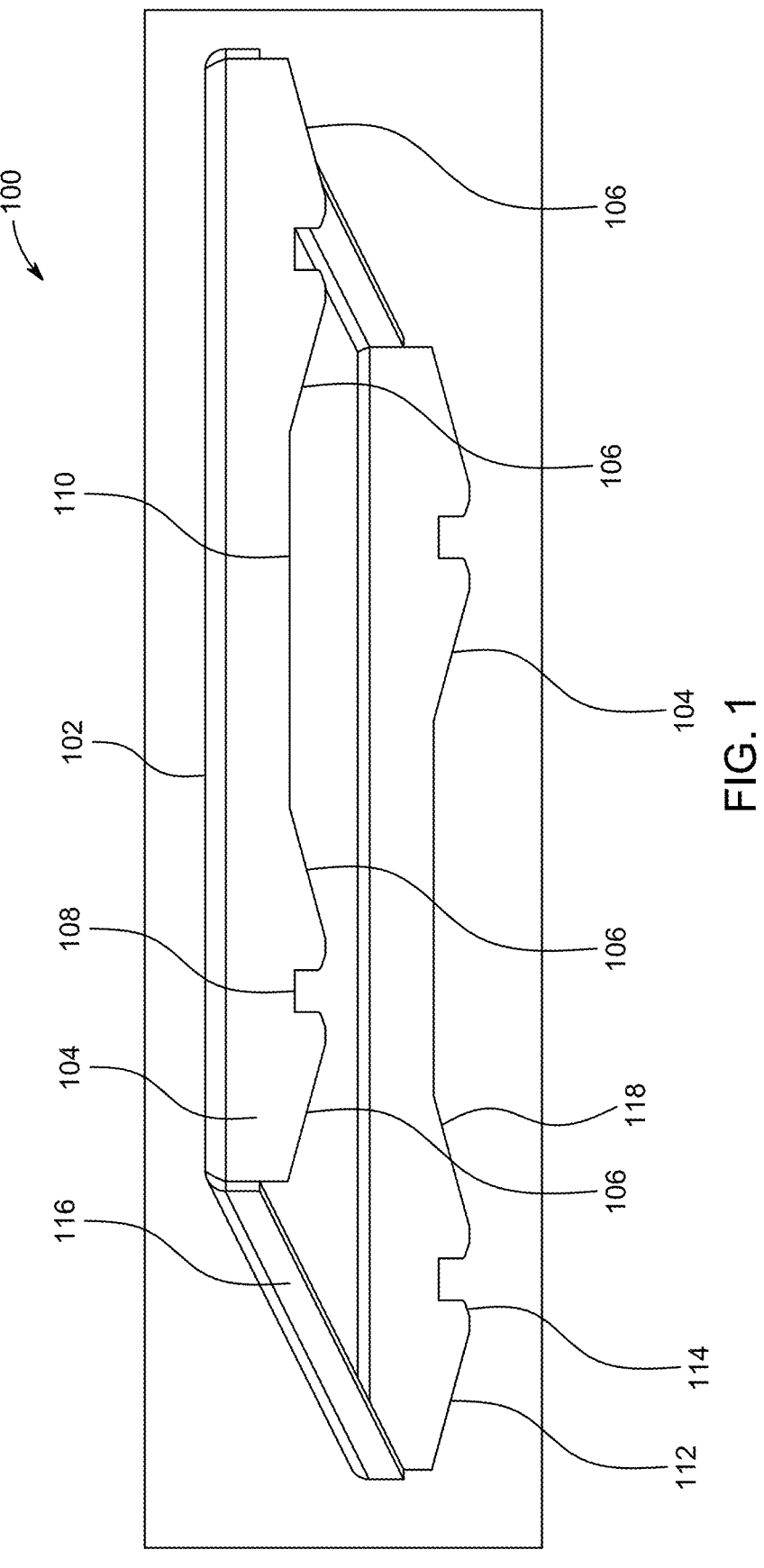
Figure 2:
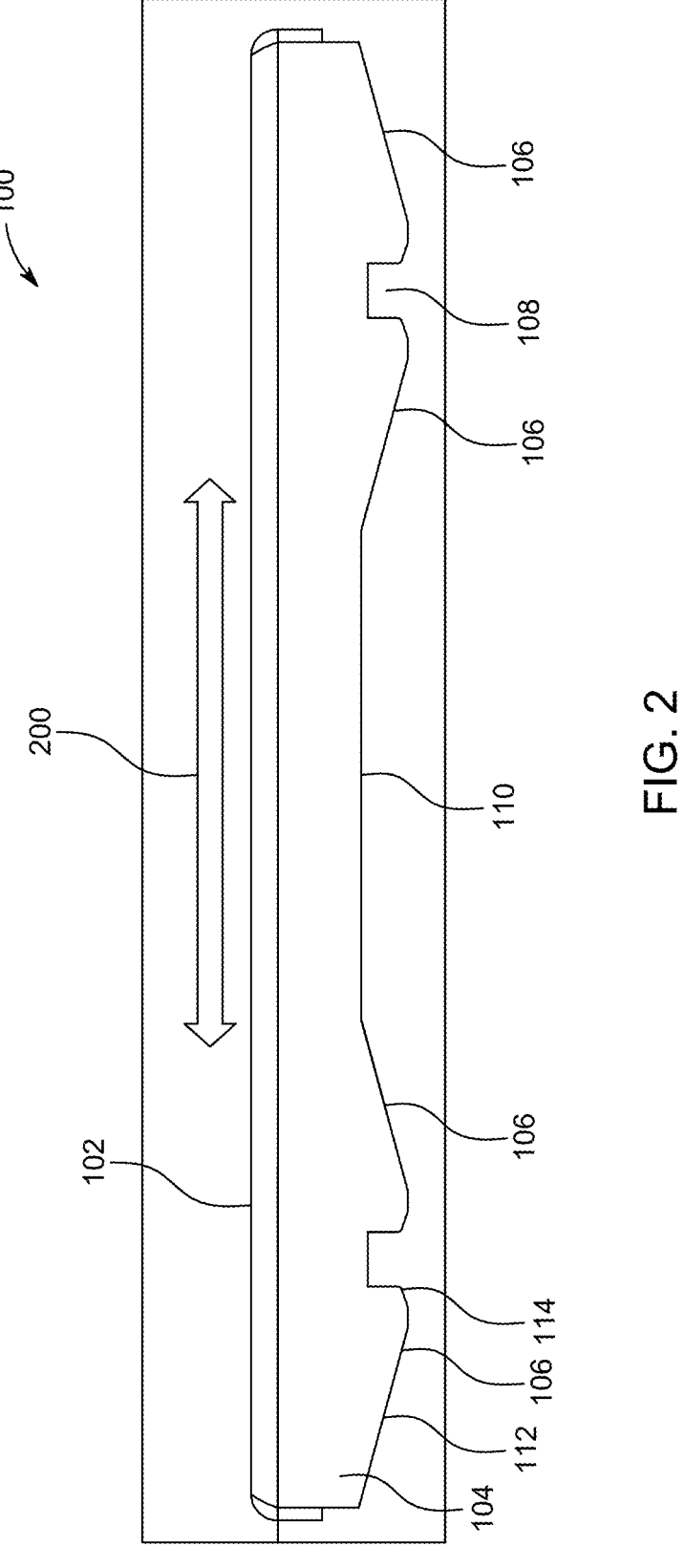
Figure 3:
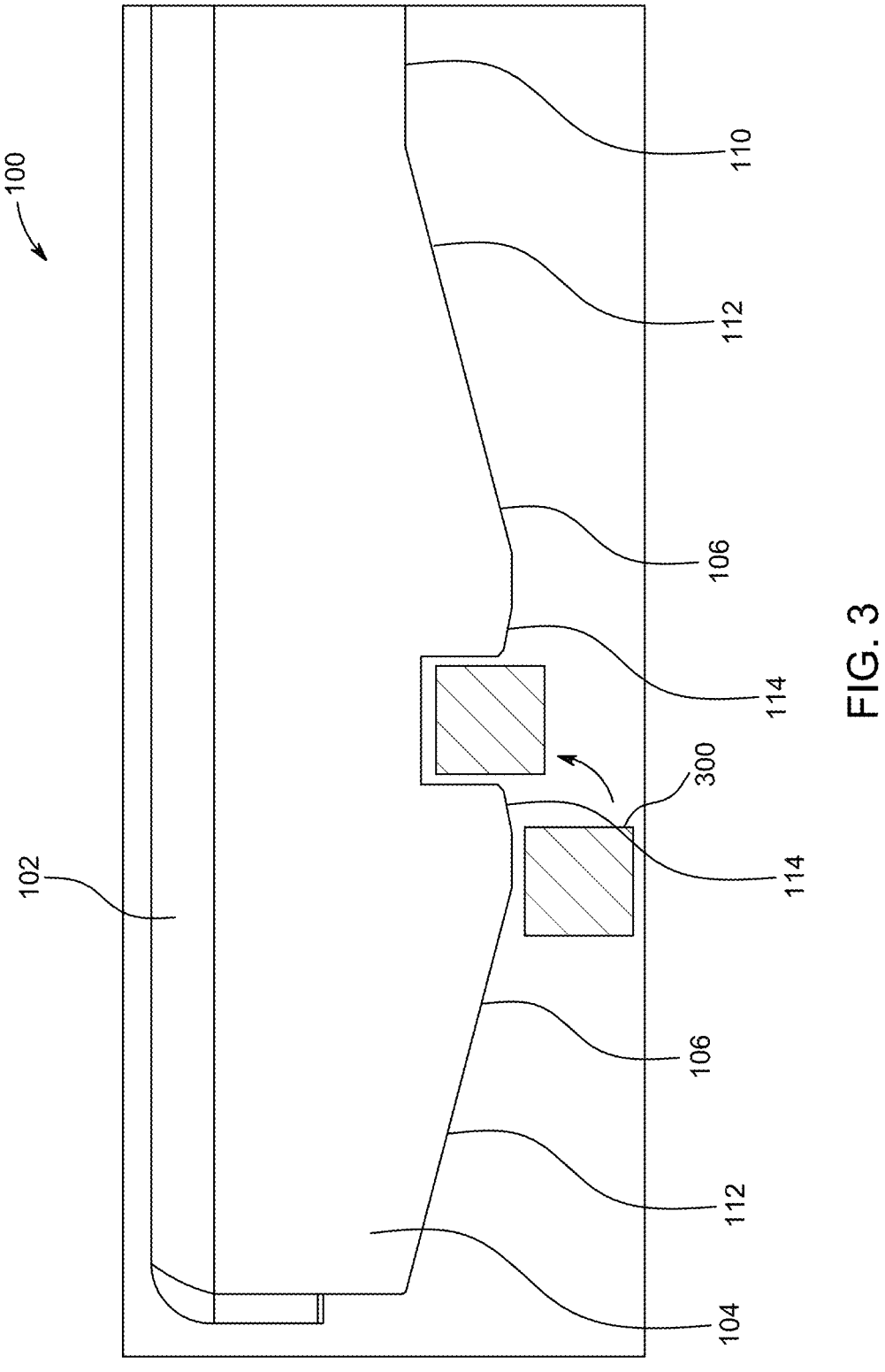
Figure 4A:
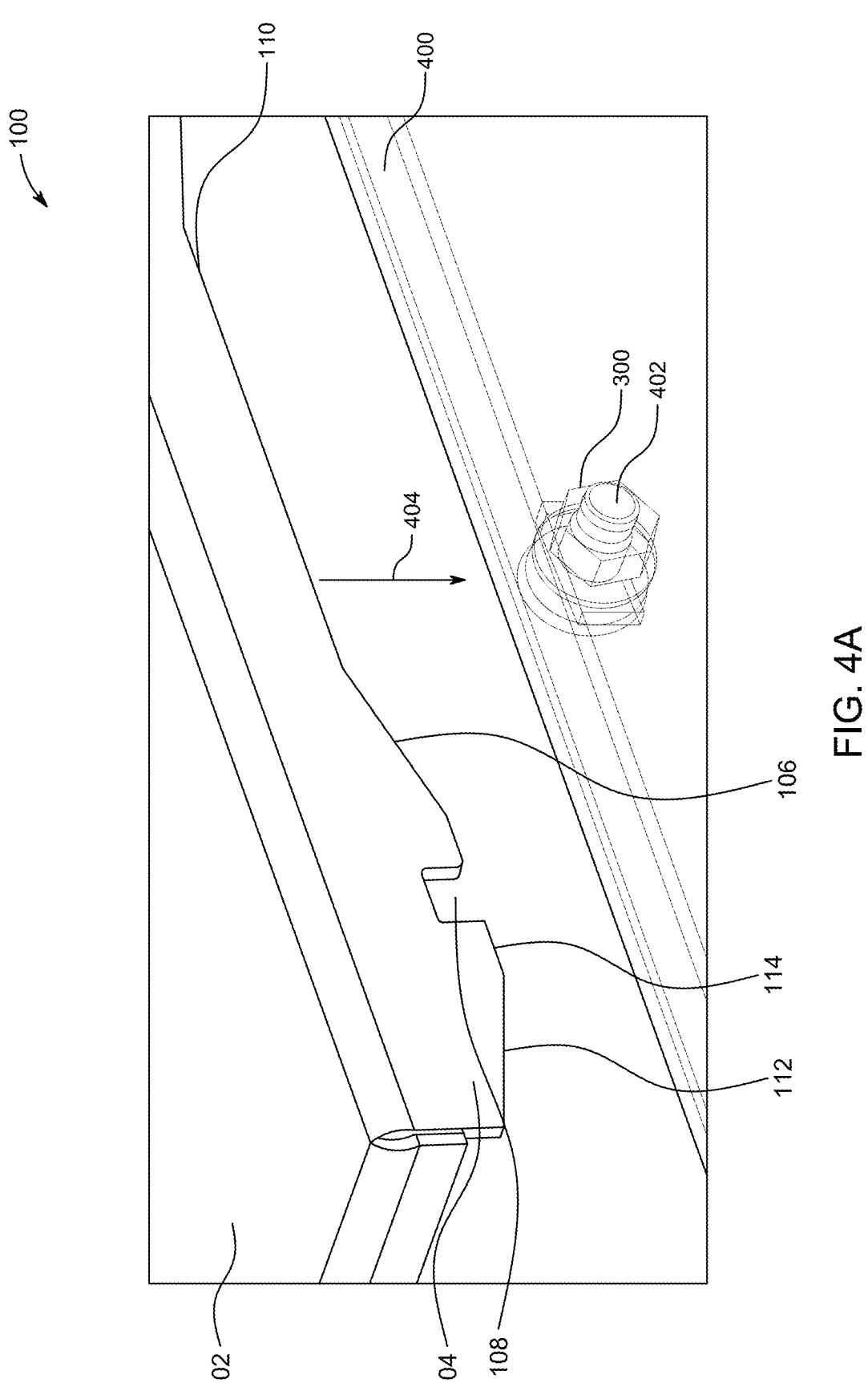
Figure 4B:
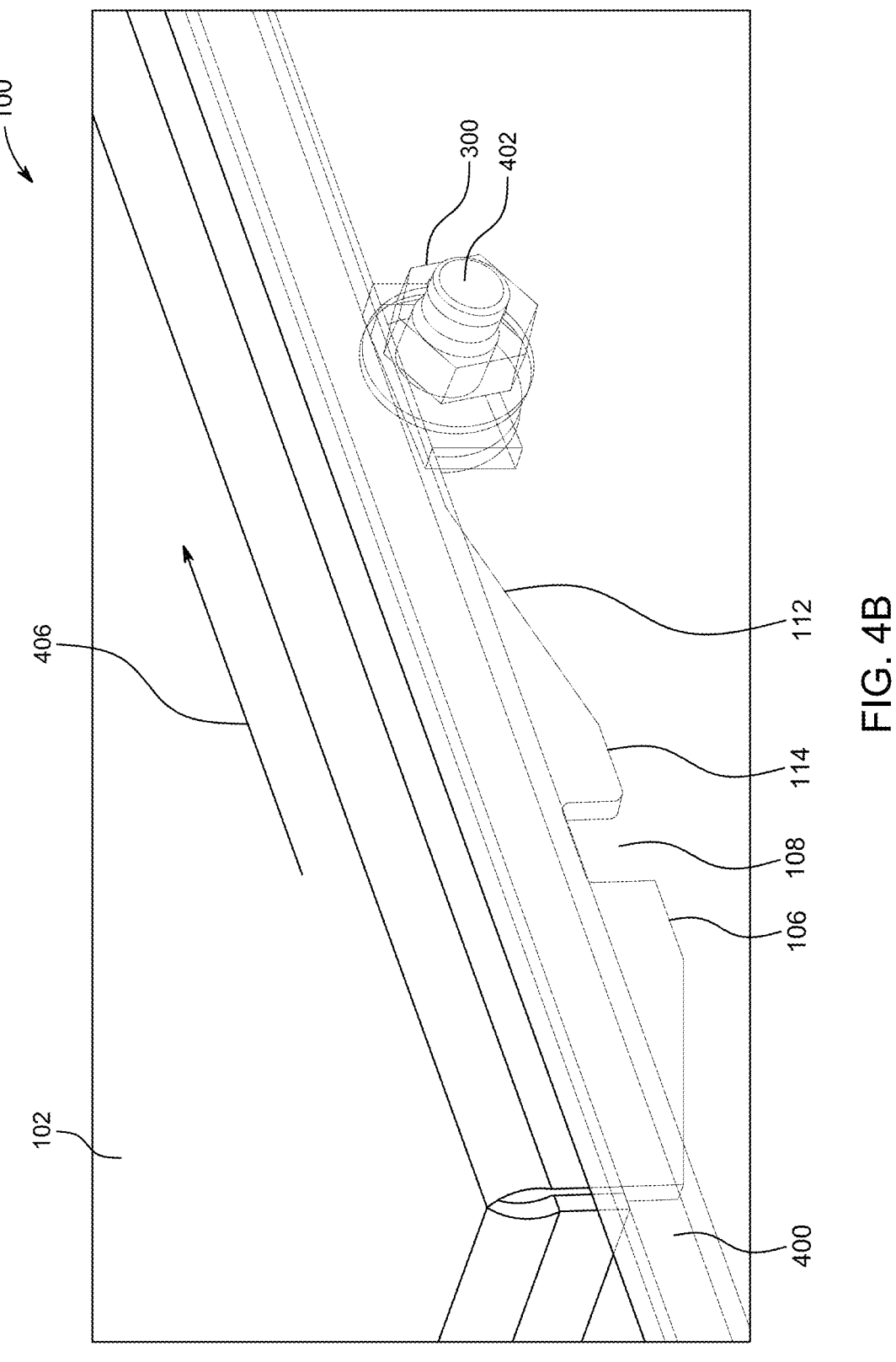
Figure 4C:
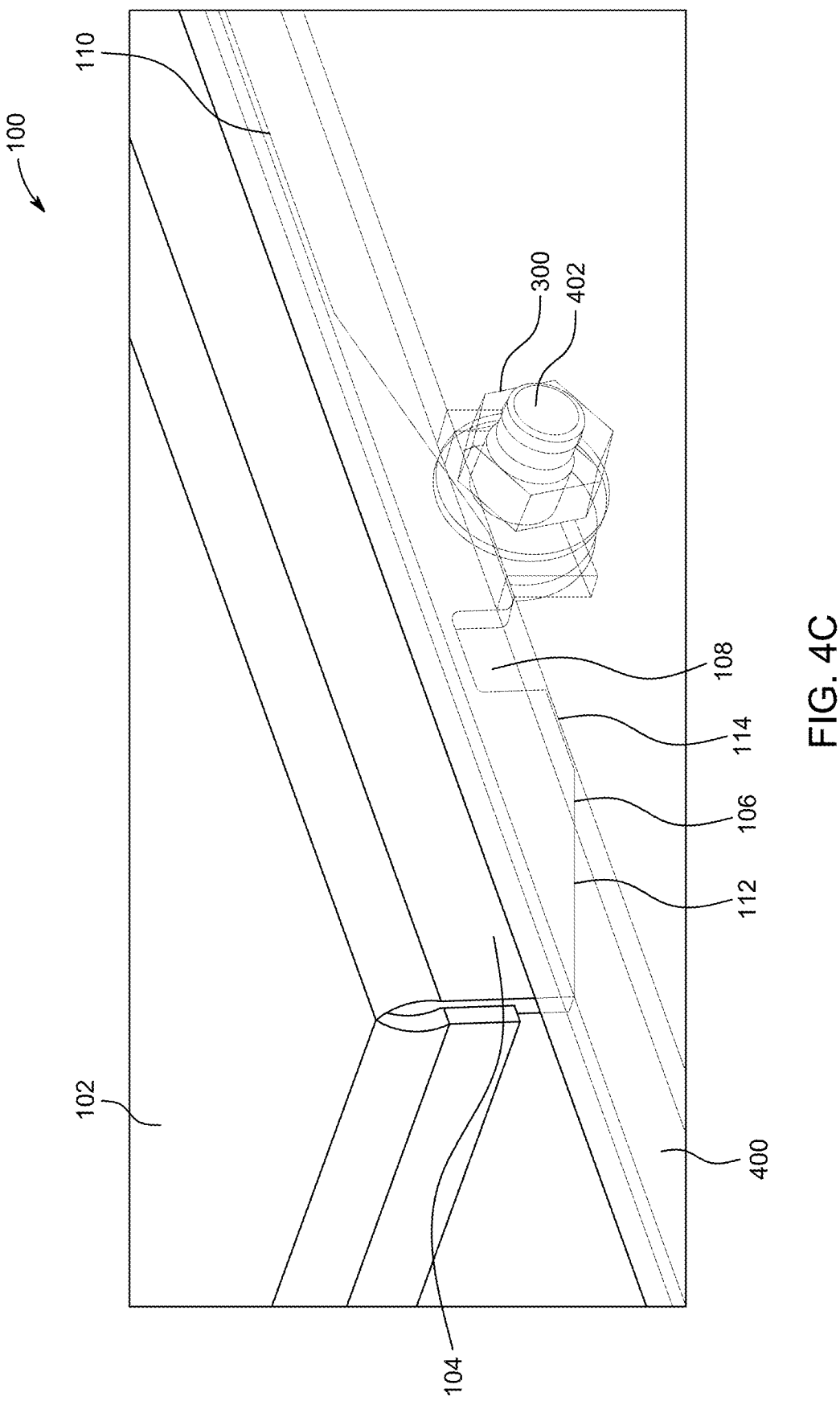
Figure 4D:
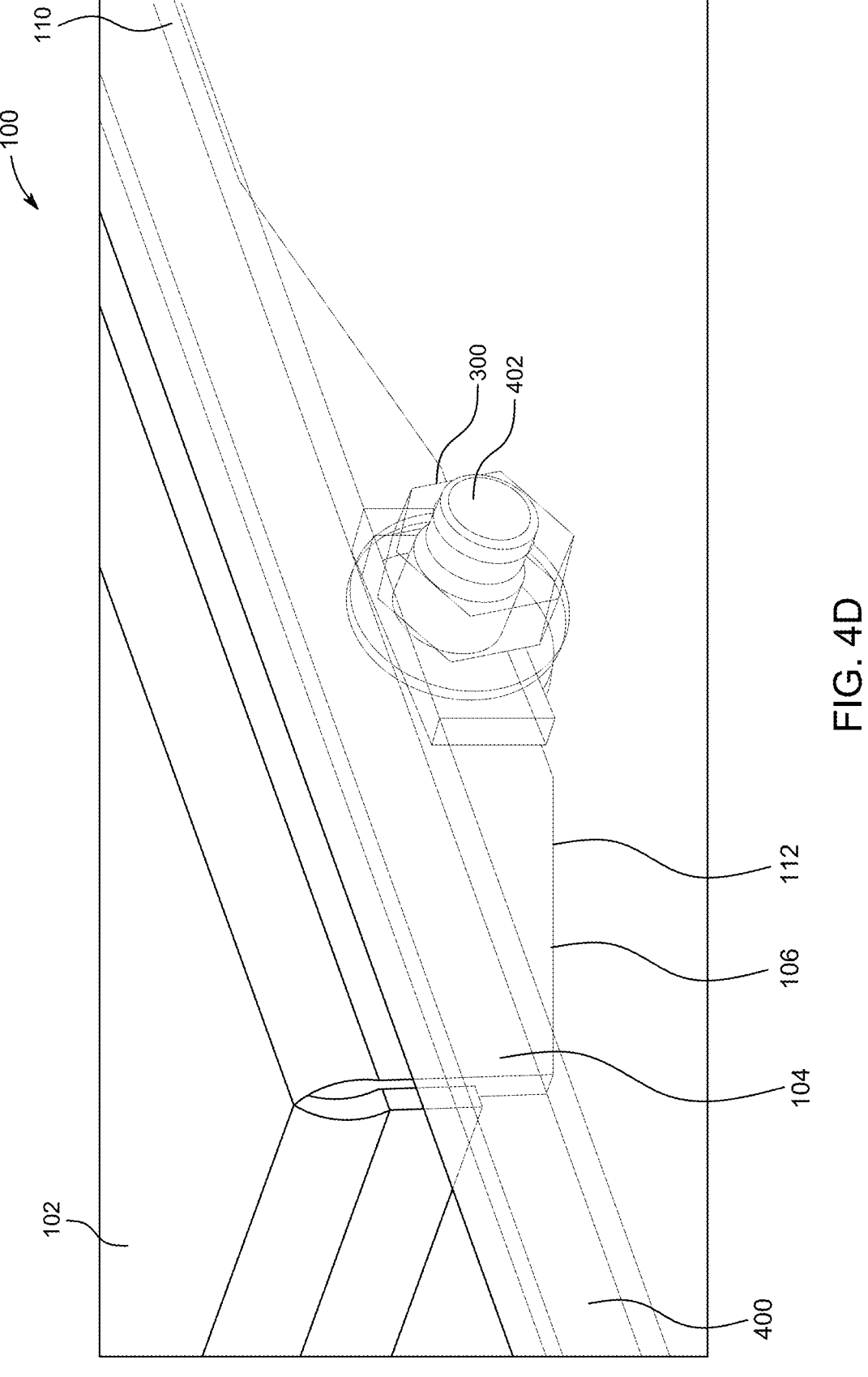

Having thus described certain example embodiments of the present disclosure in general terms, reference will hereinafter be made to the accompanying drawings, which are not necessarily drawn to scale, and wherein:

FIG. 1 illustrates a perspective view of a slider pan in accordance with an example embodiment of the present disclosure;

FIG. 2 illustrates a side view of the slider pan in accordance with an example embodiment of the present disclosure;

FIG. 3 illustrates sliding of the slider pan over a bolt to align a square notch with the bolt in accordance with an example embodiment of the present disclosure;

FIG. 4A illustrates placing the slider pan over a conveyor frame in accordance with an example embodiment of the present disclosure;

FIG. 4B illustrates movement of the slider pan in direction of the bolt in accordance with an example embodiment of the present disclosure;

FIG. 4C illustrates lifting up of the slider pan, showing the bolt is in proximity of the square notch in accordance with an example embodiment of the present disclosure; and FIG. 4D illustrates aligning the slider pan with the conveyor frame in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

FIG. 1 illustrates a perspective view of a slider pan 100, in accordance with an example embodiment of the present disclosure. FIG. 2 illustrates a side view of the slider pan 100, in accordance with an example embodiment of the present disclosure.

In some embodiments, the slider pan 100 may comprise a plate 102 having an edge, and a side panel 104. The side panel 104 may comprise a pair of lead-in features 106, such as two pairs of lead in features 106, a square notch 108, and a flat edge portion 110. Each lead-in feature 106 may comprise a first slanted edge 112 and a second slanted edge 114. The slider pan 100 may comprise two side panels 104. In some embodiments, the side panels 104 may be parallel to each other. The plate 102 may have a transverse panel 116, such as two transverse panels 116. The transverse panel 116 may extend between the side panels 104. The plate 102 may be planar. Further, the plate 102 may provide a flat surface that provides even support base for a conveyor belt. The flat surface may further minimize friction on the conveyor belt.

In some embodiments, each of the side panel 104 may be monolithic with or detachably coupled to the edge of the plate 102. The side panel 104 may extend from the plate 102 at a predefined angle. In some embodiments, the predefined angle may be a right angle. The side panel 104 may be detachably coupled to the plate 102 using at least one fastener. Such detachable coupling may allow easier replacement and maintenance of the slider pan 100. Further, the side panel 104 may be configured to have a flat edge portion 110. The flat edge portion 110 may interact with a conveyor frame 400 (FIG. 4A) and a bolt 300 for secure attachment of the slider pan 100 with the conveyor frame 400.

In some embodiments, each of the side panel 104 may comprise the flat edge portion 110. Each pair of lead-in features 106 may extend from the flat edge portion 110. The flat edge portion 110 at the side panel 104 may be configured to allow a user to slide the slider pan 100 in a horizontal direction over the conveyor frame 400. The flat edge portion 110 at the side panel 104 may be positioned between two pairs of lead-in features 106.

In some embodiments, each of the pair of lead-in features 106 may be configured to provide a slanting angle for locating, positioning, and sliding of the bolt 300. The pair of lead-in features 106 may be configured to provide the slanting angle for determining the positioning and the sliding of the bolt 300 during installation and removal of the conveyor slider pan 100. Further, the pair of lead-in features 106 may be configured to lift the slider pan 100 while sliding, to slot the square notch 108 with the corresponding bolt 300.

Each lead-in feature 106 may comprise a first slanted edge 112 and a second slanted edge 114. The first slanted edge 112 may begin at a point closer to the plate 102 of the slider pan 100 and may extend outward as the first slanted edge 112 approaches the square notch 108. The first slanted edge 112 may facilitate guiding the bolt 300 into correct position to align the bolt 300 with the square notch 108. For example, as the bolt 300 approaches the square notch 108, the first slanted edge 112 may lift the slider pan 100. The first slanted edge 112 may get farther from the plate 102 as it gets closer to the square notch 108. The lifting may provide a visual or tactile indication that the bolt 300 is in proximity to the proper position for engagement with the square notch 108. In some embodiments, the second slanted edge 114 may align the bolt 300 with the square notch 108 by guiding the bolt 300 into the square notch 108. The second slanted edge 114 may start from a point near the square notch 108 and may slope inward towards the square notch 108. For example, the second slanted edge 114 may get closer to the plate 102 as it gets closer to the square notch 108. The inward slope may guide the bolt 300 into the square notch 108 and may complete the alignment.

The square notch 108 may be configured to assist proper alignment of the slider pan 100 with the conveyor frame 400. The square notch 108 positioned between the pair of lead-in features 106 may be interlocked with the bolt 300 for locking the slider pan 100 with the conveyor frame 400. The square notch 108 may be configured to restrict rotational movement of the bolt 300 to enable fastening or unfastening the bolt 300. The pair of lead-in features 106 may be configured to facilitate positioning the bolt 300 having a square neck within the square notch 108.

In some embodiments, the slider pan 100 may be equipped by the user over the conveyor frame 400 while performing a task in an industry. The industry may comprise textile industry, automotive industry, mining, pharmaceutical industry, chemical industry, food and beverage industry, warehousing and distribution, and manufacturing industry. In some embodiments, the slider pan 100 may be constructed with a material that may be selected from a group of materials such as, but is not limited to, stainless-steel, aluminum, high strength plastic, composite materials, corrosion-resistant alloys, or any other material known in the art.

Further, the material for making the slider pan 100 may be selected carefully as the slider pan 100 may demand durability and rigidity as the slider pan 100 may be exposed to various external factors that may physically damage the slider pan 100. The various external factors that may physically damage the slider pan 100 may comprise use of abrasive materials, heavy loads, environmental conditions, and chemical exposure. In some embodiments, the material for making the slider pan 100 may be robust and wear-resistant materials. Further, use of the robust and the wear-resistant materials may ensure the slider pan 100 may withstand harsh operating conditions, minimizing wear and tear and extending service life of one or more components of the slider pan 100.

In some embodiments, the slider pan 100 may comprise two side panels 104. The two side panels 104 may comprise a left side panel 104 and a right side panel 104. In some embodiments, each of the side panel 104 may comprise the pair of lead-in features 106, such as two pair of lead-in features 106, and the square notch 108, such as two square notches 108. In some embodiments, each of the side panel 104 may be configured to align with at least one bolt 300 and the conveyor frame 400. In some embodiments, the slider pan 100 may simplify installation of the slider pan 100 over the conveyor frame 400. The slider pan 100 may provide proper alignment between the slider pan 100 and the conveyor frame 400. The slider pan 100 may enhance maintenance process by facilitating easy removal of the slider pan 100 from the conveyor frame 400. The slider pan 100 may address issues faced during alignment and fastening of the slider pan 100 to the conveyor frame 400.

In some embodiments, each pair of lead-in features 106 may ensure the slider pan 100 may be naturally guided to the correct alignment with the bolt 300, and may reduce need for precise manual adjustment, and may further simplify the installation process. Each pair of lead-in features 106 may create a guiding slope that may direct the slider pan 100 into alignment with the bolt 300. The guiding slope may overcome minor misalignment and may ensure a smooth, guided fit of the slider pan 100 over the conveyor frame 400.

In some embodiments, a first pitch angle 118 may be defined between the flat edge portion 110 and the first slanted edge 112 of the lead-in feature 106 that may extend from the flat edge portion 110. The first pitch angle 118 may be in between 10-20 degrees. Further, a second pitch angle may be defined between a line that may extend parallel to the flat edge portion 110 and the second slanted edge 114. The second pitch angle may be in between 10-20 degrees.

In some embodiments, the square notch 108 may align with the square neck of the bolt 300. The square notch 108 may prevent the bolt 300 from rotating. The square neck of the bolt 300 may have a diagonal that may be larger than a width of the square notch 108 to prevent a rotation of the bolt 300 when the square neck of the bolt 300 is within the square notch 108. In some embodiments, by fitting snugly around the square neck of the bolt 300, the square notch 108 may ensure that the bolt 300 does not move or tilt, maintaining a stable alignment between the square notch 108 and the bolt 300. Further, the square notch 108 positioned between the pair lead-in features 106 may be interlocked with the corresponding bolt 300 for locking the slider pan 100 with the conveyor frame 400. Further, the square notch 108 may be configured to restrict rotation movement of the bolt 300 to enable fastening or unfastening the carrier bolt 300 with the bolt 300.

In some embodiments, the self-guiding pair of lead-in features 106 and the secure fit provided by the square notch 108 may simplify the installation and maintenance process. The user may quickly and easily align and secure the slider pan 100, reducing downtime and labor costs. In some embodiments, FIG. 2 shows horizontal movement of the slider pan 100 as shown by an arrow 200. In some embodiments, the slider pan 100 may be placed over the conveyor frame 400 by the user. Further, the slider pan 100 may be moved parallel to the conveyor frame 400 after placing the slider pan 100 over the conveyor frame 400 (not shown).

In some embodiments, when the slider pan 100 may be moved horizontally into place, the pair of lead-in features 106 may direct the square notch 108 over the bolt 300. As the slider pan 100 may be moved horizontally into the place, the square notch 108 may ensure that the bolt 300 may fit securely and maintain proper orientation. Further, the square notch 108 may be interlocked with the corresponding the bolt 300. The bolt 300 may lock the slider pan 100 with the conveyor frame 400. The slider pan 100 may prevent the bolt 300 from rotating or moving out of alignment during the horizontal movement of the slider pan 100. The horizontal movement of the slider pan 100 and the alignment may reduce the time and effort required for the maintenance tasks. The slider pan 100 may be quickly removed and reattached, minimizing the downtime and the labor costs.

FIG. 3 illustrates sliding of the slider pan 100 over the bolt 300 to align the square notch 108 with the bolt 300, in accordance with an example embodiment of the present disclosure.

In some embodiments, the bolt 300 may correspond to a square necked bolt. The bolt 300 may be pre-positioned in the conveyor frame 400, and may be ready to fit into the square notch 108. The bolt 300 may have the square neck that may match the square shape of the square notch 108.

In some embodiments, the slider pan 100 may be initially placed near intended position on the conveyor frame 400, with the pair of lead-in features 106 directed towards the bolt 300. Further, the user may push or pull the slider pan 100 horizontally, guided by the pair of lead-in features 106. As the slider pan 100 may slide, the square notch 108 may also move horizontally towards the bolt 300. The pair of lead-in features 106 may facilitate directing the square notch 108 into precise alignment with the bolt 300. The square notch 108 may align with the square neck of the bolt 300. Once aligned, the square notch 108 may fit snugly around the bolt 300. The square notch 108 may restrict the rotation movement of the bolt 300 and may ensure the slider pan 100 may remain securely attached to the conveyor frame 400 during operation of the conveyor system.

FIG. 4A illustrates placing the slider pan 100 over a conveyor frame 400, in accordance with an example embodiment of the present disclosure. FIG. 4B illustrates movement of the slider pan 100 in the direction of the bolt 300, in accordance with an example embodiment of the present disclosure. FIG. 4C illustrates lifting up of the slider pan 100, showing the bolt 300 is in the proximity of the square notch 108, in accordance with an example embodiment of the present disclosure. FIG. 4D illustrates aligning the slider pan 100 with the bolt 300, in accordance with an example embodiment of the present disclosure.

In some embodiments, the square notch 108 may allow tightening of the bolt 300 from outside the slider pan 100. The slider pan 100 may be attached to the conveyor frame 400 using the bolt 300 and a flange nut 402. The bolt 300 may be placed inside of the conveyor frame 400. The bolt 300 may be tightened from outside the conveyor frame 400. In some embodiments, the slider pan 100 may be placed over the conveyor frame 400 as shown by an arrow 404.

In some embodiments, the slider pan 100 may be prepared for installation by placing the slider pan 100 near the intended position on the conveyor frame 400. Further, the bolt 300 may be pre-positioned within the conveyor frame 400 and may be paired with the loosened flange nut 402. Further, the user may ensure that the bolt 300 and the flange nut 402 may be ready to receive and secure the slider pan 100. Further, the slider pan 100 may be placed down onto the conveyor frame 400. The pair of lead-in features 106 and the square notch 108 incorporated into the slider pan 100 may guide the conveyor slider pan 100 into the correct position over the bolt 300.

Further, the slider pan 100 may be configured to slide as shown by an arrow 406 (FIG. 4B) such that the pair of lead-in features 106 and the square notch 108 towards may move towards the bolt 300. Further, the pair of lead-in features 106 may enable to lift the slider pan 100 as shown in the FIG. 4C. Further, as the slider pan 100 may be lowered, the pair of lead-in features 106 may direct the square notch 108 towards the bolt 300. Further, once the slider pan 100 may be in contact with the bolt 300, the slider pan 100 may slide horizontally to align the square notch 108 with the bolt 300. The pair of lead-in features 106 may ensure that the slider pan 100 may move into the correct position without requiring extensive manual adjustments. The slider pan 100 may correspond to a conveyor slider pan.

Further, the square opening in the square notch 108 may fit snugly around the square neck of the bolt 300, preventing any rotational movement of the bolt 300. Further, with the slider pan 100 aligned with the conveyor frame 400, the flange nut 402 may be tightened to secure the bolt 300 and may attach the slider pan 100 to the conveyor frame 400. In some embodiments, the secure fit provided by the square notch 108 and the tightened flange nut 402 may ensure that the slider pan 100 may remain stable and properly aligned during the operation of the conveyor system.

In some embodiments, a method for the slider pan 100 is described. In some embodiments, side panel 104 may be monolithically or detachably coupled to an edge of the plate 102. The side panel 104 may extend from the plate 102 at a predefined angle. The predefined angle may be a right angle. In some embodiments, each side panel 104 may be configured to have pair of lead-in features 106 and a square notch 108 positioned between a pair of lead-in features 106. The pair of lead-in features 106 may provide a slanting angle for determining positioning and sliding of the bolt 300.

Further, the pair of lead-in features 106 may facilitate positioning the bolt 300 having the square neck within the square notch 108. In some embodiments, the square notch 108 may assist proper alignment of the slider pan 100 with the bolt 300. Further, with the slider pan 100 positioned by the pair of lead-in features 106, the user may secure the proper alignment using the square notch 108. The square notch 108 may assist in the precise alignment of the slider pan 100 with the bolt 300. The square notch 108 may feature the square-shaped opening that may match the square neck of the bolt 300. The square notch 108 may guide the slider pan 100 into the final alignment position, ensuring that the bolt 300 may be properly seated and secured within the square notch 108. Once the square notch 108 may be aligned with the bolt 300, the user may tighten the flange nut 402 to secure the connection.

The present disclosure involves simplified installation of the slider pan 100 over the conveyor frame 400. The self-guiding features of the pair of lead-in features 106 and the secure fit of the square notch 108 may simplify the installation process. The self-guiding features of the pair of lead-in features 106 and the secure fit of the square notch 108 may further reduce the need for precise manual alignment and speeding up the overall assembly. The present disclosure may ensure that the slider pan 100 may align accurately with the pre-positioned bolt 300. The present disclosure may reduce the risk of misalignment and may enhance the stability of the connection between the slider pan 100 and the conveyor frame 400. The case of alignment and secure attachment provided by the present disclosure may simplify the maintenance tasks, allowing the slider pan 100 to be quickly removed and reinstalled with minimal downtime. Further, the secure and stable connection between the slider pan 100 and the conveyor frame 400 may enhance the durability and longevity of the slider pan 100.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A slider pan comprising:
   a plate having an edge; and
   a side panel that is monolithic with or detachably coupled to the edge of the plate, the side panel extending from the plate at a predefined angle, the side panel comprising:
      a pair of lead-in features that each comprise a first slanted edge; and
      a square notch positioned between the pair of lead-in features, wherein the pair of lead-in features are configured to facilitate positioning a bolt having a square neck within the square notch.

2. The slider pan of claim 1, wherein the plate is planar, and the predefined angle is a right angle.

3. The slider pan of claim 1, wherein the slider pan comprises two side panels and a transverse panel that extends between the two side panels, and wherein the two side panels are parallel to each other.

4. The slider pan of claim 1, wherein the side panel has a flat edge portion, wherein one of the pair of lead-in features extends from the flat edge portion.

5. The slider pan of claim 4, wherein a first pitch angle is defined between the flat edge portion and the first slanted edge of the lead-in feature that extends from the flat edge portion, wherein the first pitch angle is in between 10-20 degrees.

6. The slider pan of claim 4, wherein each lead-in feature comprises a second slanted edge that extends from the square notch, wherein a second pitch angle is defined between a line that extends parallel to the flat edge portion and the second slanted edge.

7. The slider pan of claim 4, wherein the side panel comprises two pairs of lead-in features, wherein the flat edge portion is positioned between the two pairs of lead-in features, wherein the flat edge portion is configured to allow a user to slide the plate in a horizontal direction over the square neck of the bolt.

8. The slider pan of claim 1, wherein each lead-in feature comprises a second slanted edge, wherein the first slanted edge gets farther from the plate as it gets closer to the square notch, and wherein the second slanted edge gets closer to the plate as it gets closer to the square notch.

9. The slider pan of claim 6, wherein the first slanted edge of each of the lead-in features is configured to lift the slider pan while the slider pan slides on the square neck of the bolt to provide an indication of a proximity of the bolt to the square notch.

10. The slider pan of claim 1, wherein the square neck of the bolt has a diagonal that is larger than a width of the square notch to prevent a rotation of the bolt when the square neck of the bolt is within the square notch.

11. A method comprising:
    coupling, monolithically or detachably, a side panel to an edge of a plate to form a slider pan, wherein the side panel is extending from the plate at a predefined angle, and the side panel comprising:

a pair of lead-in features that each comprise a first slanted edge; and
    a square notch positioned between the pair of lead-in features; and
    facilitating, via the pair of lead-in features, positioning of a bolt having a square neck within the square notch.

12. The method of claim 11, wherein the plate is planar, and the predefined angle is a right angle.

13. The method of claim 11, wherein the slider pan comprises two side panels and a transverse panel that extends between the two side panels, and wherein the two side panels are parallel to each other.

14. The method of claim 11, wherein the side panel has a flat edge portion, wherein one of the pair of lead-in features extends from the flat edge portion.

15. The method of claim 14, wherein a first pitch angle is defined between the flat edge portion and the first slanted edge of the lead-in feature that extends from the flat edge portion, wherein the first pitch angle is in between 10-20 degrees.

16. The method of claim 14, wherein each lead-in feature comprises a second slanted edge that extends from the square notch, wherein a second pitch angle is defined between a line that extends parallel to the flat edge portion and the second slanted edge.

17. The method of claim 14, wherein the side panel comprises two pairs of lead-in features, wherein the flat edge portion is positioned between the two pairs of lead-in features, wherein the flat edge portion is configured to allow a user to slide the plate in a horizontal direction over the square neck of the bolt.

18. The method of claim 11, wherein each lead-in feature comprises a second slanted edge, wherein the first slanted edge gets farther from the plate as it gets closer to the square notch, and wherein the second slanted edge gets closer to the plate as it gets closer to the square notch.

19. The method of claim 16, wherein the first slanted edge of each of the lead-in features is configured to lift the slider pan while the slider pan slides on the square neck of the bolt to provide an indication of a proximity of the bolt to the square notch.

20. The method of claim 11, wherein the square neck of the bolt has a diagonal that is larger than a width of the square notch to prevent a rotation of the bolt when the square neck of the bolt is within the square notch.

* * * * *